(12) United States Patent
Matsumoto et al.

(10) Patent No.: US 7,561,345 B2
(45) Date of Patent: Jul. 14, 2009

(54) METHOD FOR FABRICATING LENS UNIT, LENS UNIT AND IMAGING APPARATUS

(75) Inventors: Tomohiro Matsumoto, Sakai (JP); Yoshifumi Mitani, Osaka (JP); Naohiko Hayashi, Matsubara (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 294 days.

(21) Appl. No.: 11/481,075

(22) Filed: Jul. 5, 2006

(65) Prior Publication Data

US 2007/0008627 A1   Jan. 11, 2007

(30) Foreign Application Priority Data

Jul. 7, 2005    (JP) .............................. 2005-198742

(51) Int. Cl.
*G02B 15/14* (2006.01)
(52) U.S. Cl. ...................... 359/704; 359/703
(58) Field of Classification Search .............. 359/704
See application file for complete search history.

(56) References Cited

U.S. PATENT DOCUMENTS 6,661,970 B2    12/2003   Nomura et al.
2004/0150891 A1*   8/2004   Ichino ......................... 359/704
2005/0285970 A1*  12/2005   Yamaguchi et al. ......... 348/363

FOREIGN PATENT DOCUMENTS

JP          2002-341223         11/2002

OTHER PUBLICATIONS

Figs. 6 and 7 of present application filed Jul. 5, 2006 entitled "Method for Fabricating Lens Unit, Lens Unit and Imaging Apparatus."

* cited by examiner

*Primary Examiner*—Jordan M. Schwartz
*Assistant Examiner*—James C Jones
(74) *Attorney, Agent, or Firm*—Brinks Hofer Gilson & Lione

(57) ABSTRACT

The present invention provides a method for fabricating a lens unit in which an inter-barrel member can be fixed with a high degree of accuracy without enlarging the lens barrels and the accuracy of the dimension of the inter-barrel member is not required. The method comprises the steps of: disposing an inter-barrel member 11 in a gap "g" defined between a front lens barrel 7 on a subject side in an optical-axis direction x and a rear lens barrel 8 on an imaging surface side in the optical-axis direction x; bringing the inter-barrel member 11 into close contact with one of the front lens barrel 7 and the rear lens barrel 8 in the optical-axis direction x; inserting a resilient member 12 into a space in the optical-axis direction x between the inter-barrel member 11 and the other of the front lens barrel 7 and the rear lens barrel 8; and fixing the front lens barrel 7 and the rear lens barrel 8 integrally with each other to compress the resilient member 12 in the optical-axis direction x.

11 Claims, 7 Drawing Sheets

METHOD FOR FABRICATING LENS UNIT, LENS UNIT AND IMAGING APPARATUS

This application is based on Japanese Patent Application No. 2005-198742 the contents in which are incorporated herein by reference.

BACKGROUND OF THE INVENTION

The present invention relates to a method for fabricating a lens unit, specifically to a method for fixing an inter-barrel member in an optical path. The present invention relates to a lens unit fabricated by the method and an imaging apparatus including the lens unit.

In a lens unit employed in an imaging apparatus such as camera, an inter-barrel member such as a shutter unit and an anti-shake unit for driving an optical member to stabilize image is disposed in an intermediate portion of the lens barrel (see patent documents 1, 2).

Patent Document 1:

Japanese Laid-open patent publication No. 2002-341223

Patent Document 2:

U.S. Pat. No. 6,661,970 B2

FIG. 6 shows a construction of a conventional typical lens unit 51. The lens unit 51 has a single lens barrel comprising a front lens barrel 52 on a subject side in an optical-axis direction and a rear lens barrel 53 on an imaging surface side in the optical-axis direction. The lens unit 51 comprises, in the order from the object side, a first lens 54 fixed on the tip end of the front lens barrel 52, a second lens 55 movable in the optical-axis direction inside the front lens barrel 52, a shutter unit (inter-barrel member) 56 inserted between the front lens barrel 52 and the rear lens barrel 53 and a third lens 57 fixed on the rear lens barrel 53. The front lens barrel 52 and the rear lens barrel 53 have flange portions 52a and 53a, respectively formed by extending the facing end portions toward outside. The flange portion 52a and the shutter unit 56 are fixed to the flange portion 53a by means of screws 58.

In the lens unit 51, the distance between the first lens 54 or the second lens and the third lens 57 is determined by the sizes of the front lens barrel and the rear lens barrel 53 and the thickness of the shutter unit 56. The relative positions of each lens 54, 55, 57 involved in imaging need to be exactly determined and the dimensions of the front lens barrel 52, the rear lens barrel 53 and the shutter unit 56 need to be precisely fabricated. Enhancing the accuracy of the dimension of the shutter unit constituted by combining a plurality of members causes a problem of high fabrication cost.

FIG. 7 shows a construction of a conventional lens unit 51' in which the accuracy of the dimension of the shutter unit 56 is not required. In the lens unit 51', the flange portion 52a of the front lens barrel 52 and the flange portion 53a of the rear lens barrel 53 are directly fixed by means of screws 58, while the shutter unit 56 is fixed by means of screws 59 on a seat portion 53b protruding inside the rear lens barrel 53. The relative positions of the lenses 54, 55, 57 are determined by the front lens barrel 52 and the rear lens barrel 53 irrespective of the dimension of the shutter unit 56. However, in this construction, as the seat portion 53b protruding inside the rear lens barrel 53 is provided and the screws 59 are arranged inside the lens barrels 52, 53, the diameters of the lens barrels 52, 53 need to be enlarged so that the seat portion 53b and the screws 59 will not interfere with the optical path. Thus, there has been a disadvantage that it is not possible to meet the needs of miniaturization to the lens unit.

SUMMARY OF THE INVENTION

It is an object of the present invention to provide a method for fabricating a lens unit in which an inter-barrel member can be fixed with a high degree of accuracy without enlarging the lens barrels and the accuracy of the dimension of the inter-barrel member is not required.

It is an another object of the present invention to provide a lens unit and an imaging apparatus which is small size and inexpensive in spite of having an inter-barrel member.

In the first aspect of the present invention to accomplish the above objects, there is provided a method for fabricating a lens unit, comprising steps of:

disposing an inter-barrel member in a gap defined between a front lens barrel on a subject side in an optical-axis direction and a rear lens barrel on an imaging surface side in the optical-axis direction;

bringing the inter-barrel member into close contact with one of the front lens barrel and the rear lens barrel in the optical-axis direction;

inserting a resilient member into a space in the optical-axis direction between the inter-barrel member and the other of the front lens barrel and the rear lens barrel; and fixing the front lens barrel and the rear lens barrel integrally with each other to compress the resilient member in the optical-axis direction.

According to the method mentioned above, as a dimension necessary for imaging is decided by the front lens barrel and the rear lens barrel and the inter-barrel member is inserted between the front lens barrel and the rear lens barrel and fixed via the resilient member, the dimensional accuracy of the inter-barrel member is not required. Since it is not necessary to provide any screw holes or the like in the inter-barrel member, a projected area of the inter-barrel member and the lens barrels in the optical-axis direction can be made small.

In the second aspect of the present invention, there is provided a lens unit, comprising:

a front lens barrel;

a rear lens barrel, the rear lens barrel and the front lens barrel forming a gap in a optical-axis direction;

an inter-barrel member disposed in the gap, the inter-barrel member coming into close contact with one of the front lens barrel and the rear lens barrel in the optical-axis direction; and a resilient member inserted in a compressed state into a space in the optical-axis direction between the inter-barrel member and the other of the front lens barrel and the rear lens barrel.

According to the construction mentioned above, as a dimension necessary for imaging is decided by the front lens barrel and the rear lens barrel, the dimensional accuracy of the inter-barrel member is not required. Further, as the inter-barrel member is inserted with the resilient member positioned at one side, the resilient member presses the inter-barrel member against the front lens barrel or the rear lens barrel, allowing the inter-barrel member to be fixed without rattling. As the inter-barrel member is inserted in the gap defined between the front lens barrel and the rear lens barrel, a projected area in the optical-axis direction is small, enabling to slim the lens barrel and miniaturizing the lens unit.

In the lens unit according to the present invention, the inter-barrel member may be a shutter unit, which is constituted by a plurality of members and so becomes expensive if dimensional accuracy is required, or a unit for driving an optical member to stabilize image. In this case, the lens unit can be fabricated inexpensively in spite of small size and high accuracy.

In the lens unit according to the present invention, at least any one of the rear lens barrel and the front lens barrel may have a zoom lens movable in the optical-axis direction. Thus, a high functional lens unit can be provided inexpensively.

In the lens unit according to the present invention, the front lens barrel may have an optical member for bending the optical axis by substantially 90 degree. Thus, a thin lens unit can be provided inexpensively.

In the third aspect of the present invention, there is provided an imaging apparatus, comprising a lens unit and an imaging device for converting an image formed by the lens unit, the lens unit comprising:

a front lens barrel;

a rear lens barrel, the rear lens barrel and the front lens barrel forming a gap in a optical-axis direction;

an inter-barrel member disposed in the gap, the inter-barrel member coming into close contact with one of the front lens barrel and the rear lens barrel in the optical-axis direction; and a resilient member inserted in a compressed state into a space in the optical-axis direction between the inter-barrel member and the other of the front lens barrel and the rear lens barrel.

Thus, the imaging apparatus can be fabricated inexpensively in spite of small size and high accuracy.

According to the present invention, as the inter-barrel member is inserted in the gap between the front lens barrel and the rear lens barrel connected to each other via the resilient member preventing rattling, the inter-barrel member has small projected area in the optical-axis direction and the dimensional accuracy of the inter-barrel member is not required. Thus, a lens unit with high accuracy and small size can be provided inexpensively.

BRIEF DESCRIPTION OF THE DRAWINGS

Further objects and advantages of the present invention will become clear from the following description taken in conjunction with the preferred embodiments thereof with reference to the accompanying drawings, in which.

DETAILED DESCRIPTION OF THE PREFERRED EMBODIMENTS

Hereinafter, embodiments of the present invention will be described with reference to the accompanying drawings.

Figure 1:
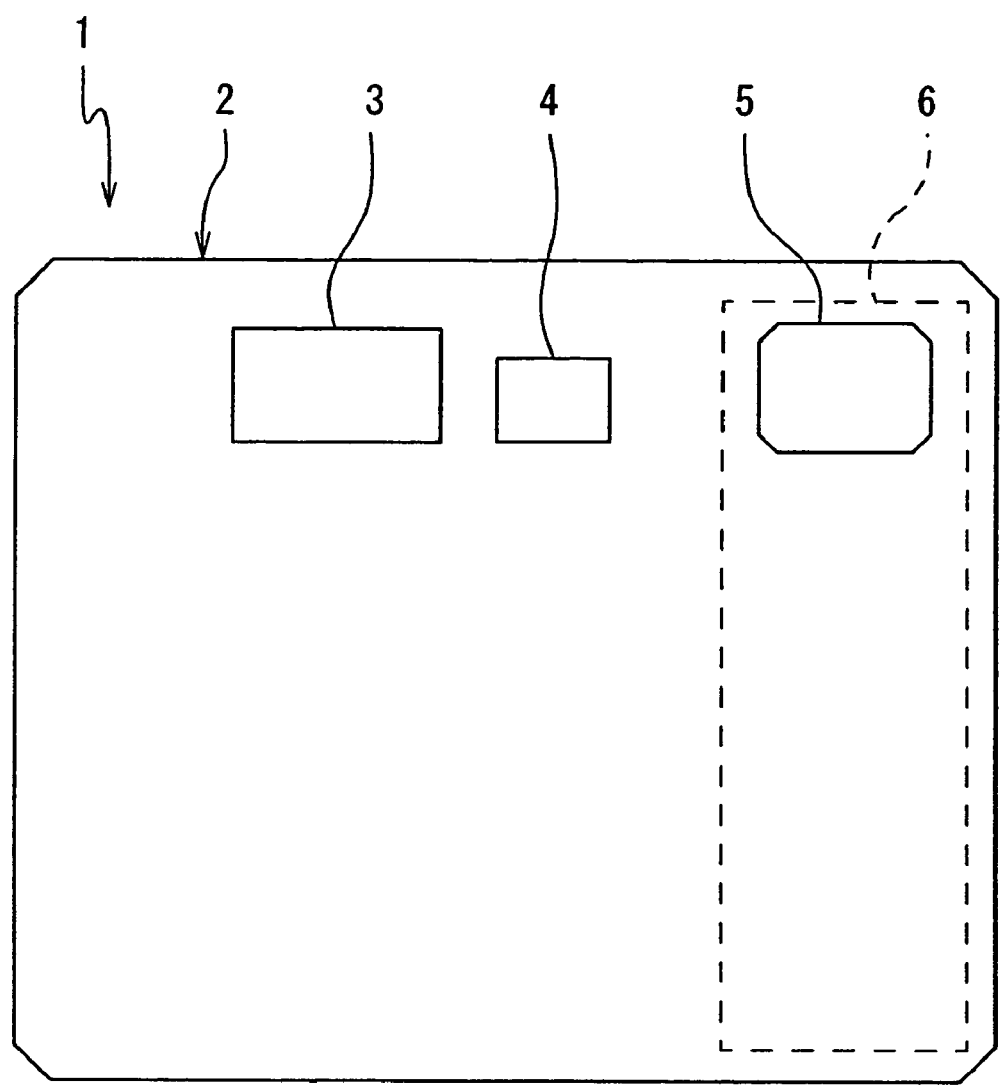
FIG. 1 is a front view of a digital camera of a first embodiment of the present invention.

FIG. 1 shows a digital camera (imaging apparatus) 1 of a first embodiment of the present invention. The digital camera 1 is provided with a photoflash lamp 3, a finder 4 and a lens opening 5 in the front surface of a body 2. The digital camera 1 is also provided with a lens unit 6 fronting an object through the lens opening 5.

Figure 2:
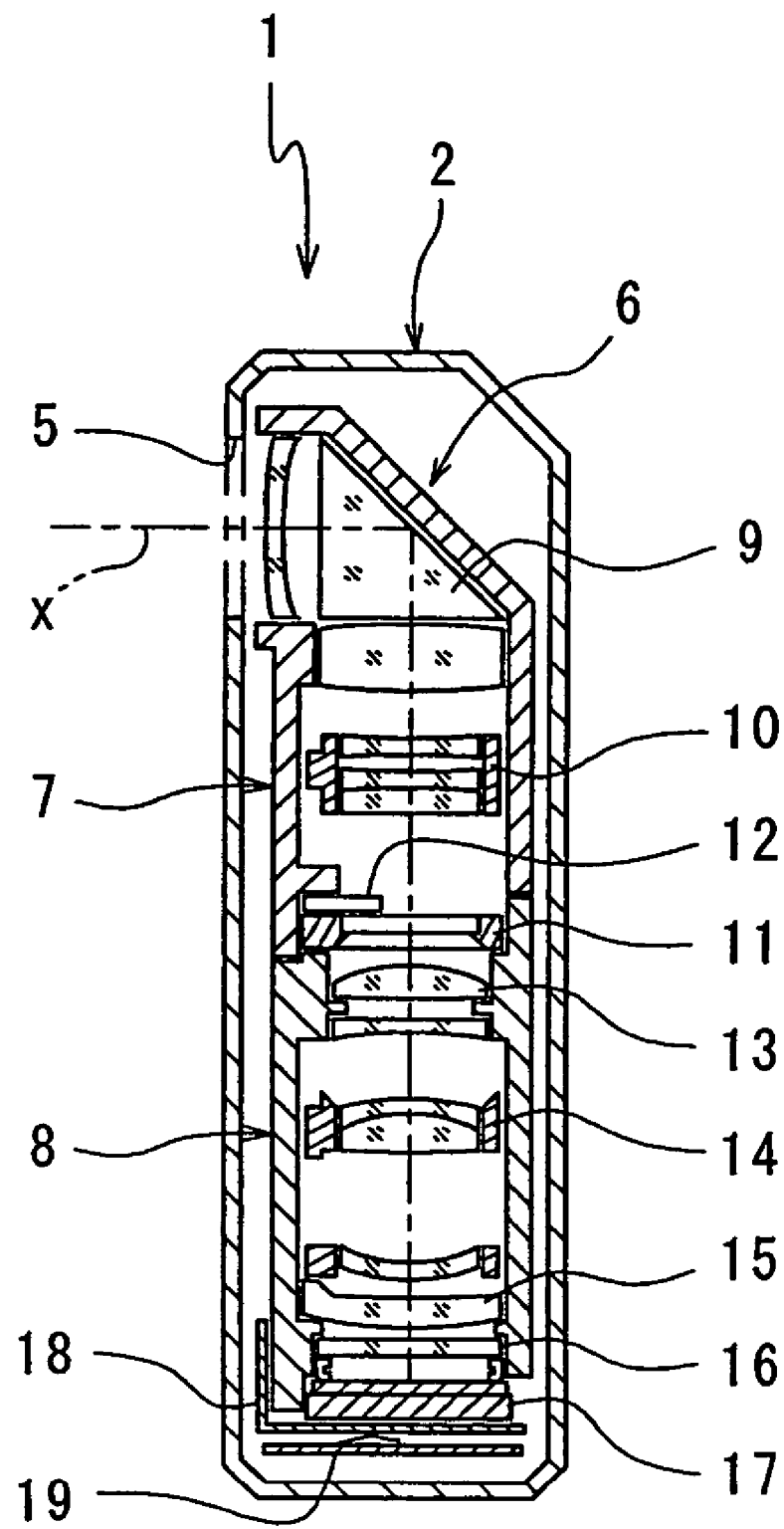
FIG. 2 is a sectional view of the digital camera of FIG. 1 at an optical axis.

FIG. 2 is a vertical section of a portion of the digital camera 1. The lens unit 6 constitutes a folded optical system having an optical member for bending an optical axis x of light entering from an object by 90 degrees. The lens unit comprises a front lens barrel 7 on the object side (upper side) in an optical-axis x direction and a rear lens barrel 8 on the imaging surface side (lower side) in the optical-axis x direction integrally fixed with each other.

In the front lens barrel 7, a first lens group 9 including an optical member for bending the light entering from the object and a second lens group 10, i.e. zoom lens movable in a vertical direction along the optical axis x are disposed. In a gap formed in a joint portion between the front lens barrel 7 and the rear lens barrel 8, a shutter unit 11 is inserted. The shutter unit 11 comes into direct contact with the rear lens barrel 8. A resilient member 12 comprising moltoprene is interposed between the shutter unit 11 and the front lens barrel 7. The resilient member 12 is sandwiched in a compressed state between the front lens barrel 7 and the shutter unit 11.

In the rear lens barrel 8, a third lens group 13 in which the light passing through the shutter unit 11 enters, a fourth lens group 14 movable in the optical-axis x direction in the rear lens barrel 8, a lower fifth lens group 15, a low pass filter 16 for cutting off the high frequency component of the light passing though the fifth lens group 15 and a imaging device 17 having an imaging surface on which the light passing though the low pass filter 16 is focused. The imaging device 17 is a CCD which converts an image focused on the imaging surface into an electric signal. The imaging device 17 is fixed on the lower end of the rear lens barrel 8 together with a heat sink 18 by means of a pressing plate 19.

Figure 3:
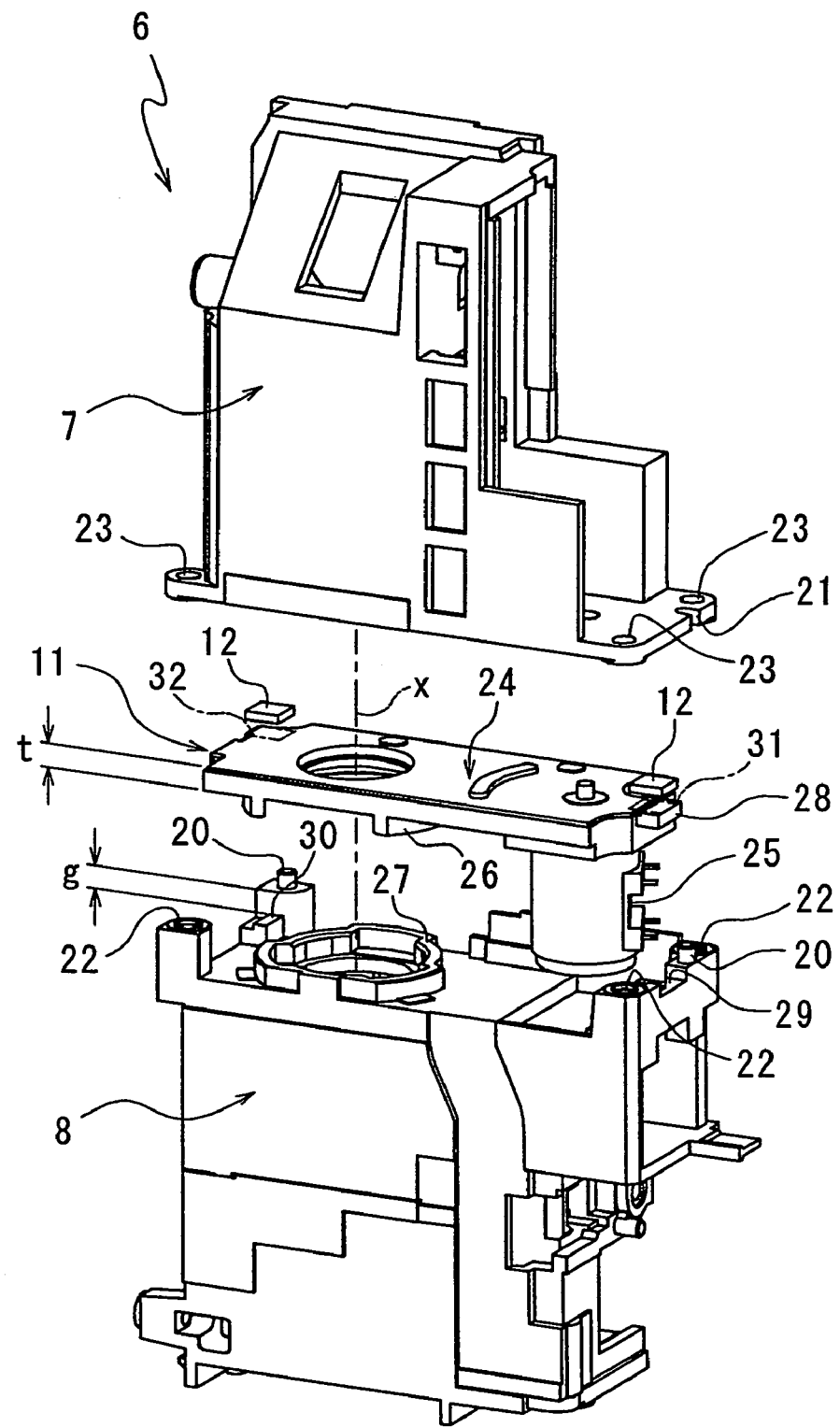
FIG. 3 is an exploded perspective view of the digital camera of FIG. 1 viewed from upper rear direction.
Figure 4:
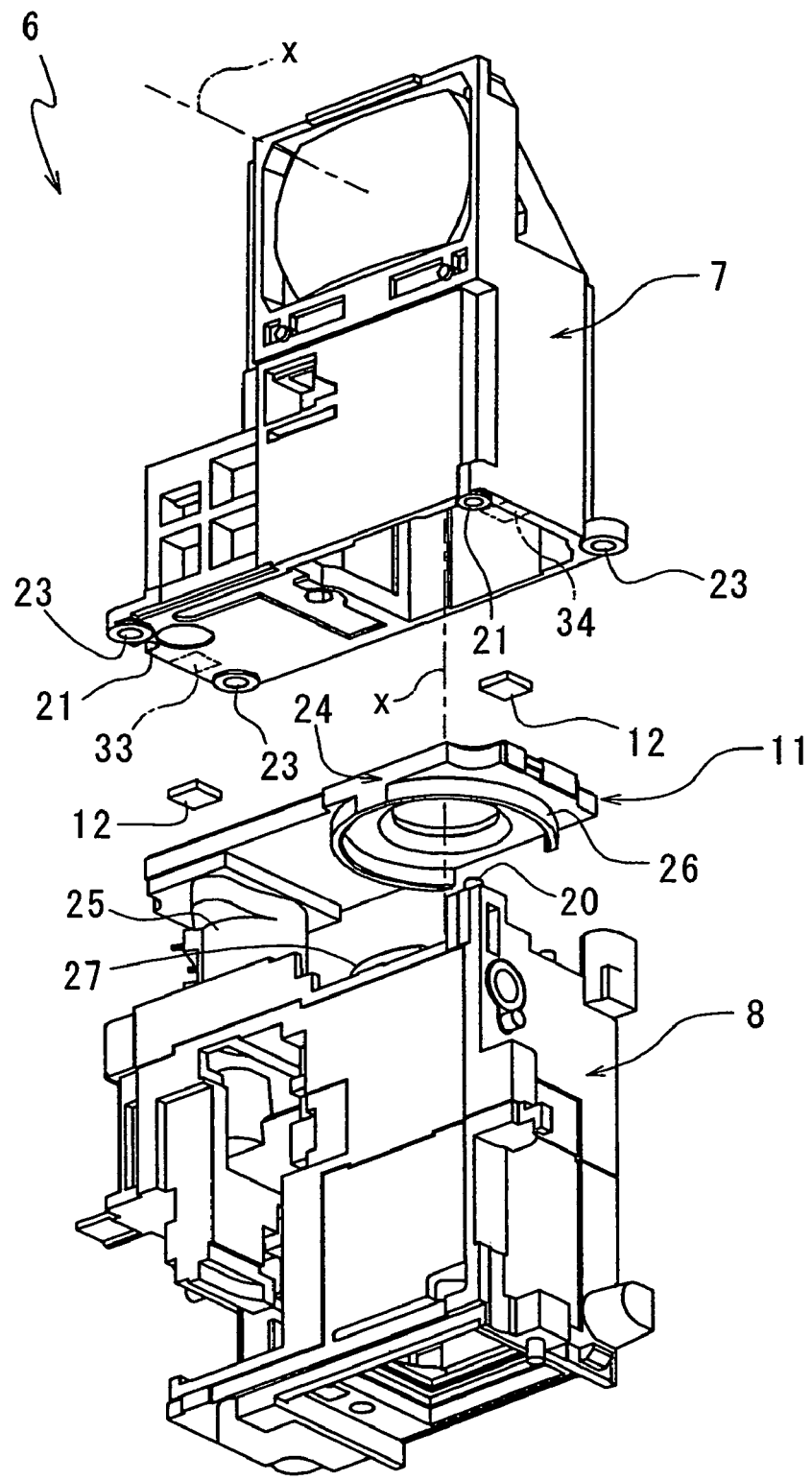
FIG. 4 is an exploded perspective view of the digital camera of FIG. 1 viewed from lower front direction.

FIGS. 3 and 4 show in great detail the lens unit 6. The front lens barrel 7 and the rear lens barrel 8 are aligned with each other by engaging two pins 20 provided on the rear lens barrel 8 with pin guides 21 of the front lens barrel 7. Both the front lens barrel 7 and the rear lens barrel 8 are fixed integrally to each other by passing screws not shown through connection holes 23 of the front lens barrel 7 and tightening the screws into three screw holes 22 provided on the rear lens barrel 8.

The shutter unit 11 comprises a mechanism portion 24 with movable vane incorporated and a motor 25 for driving the movable vane. An annular projection 26 surrounding the optical path is formed on the imaging surface side (lower side) of the mechanism portion 24. The annular projection 26 engages with an engagement annular portion 27 formed on the rear lens barrel 8 so that the aperture center of the shutter unit 11 can be aligned with the optical path x. A protrusion end portion 28 protruded from the end portion engages with an engagement recess portion 29 formed on the rear lens barrel 8 so that an angle of the shutter unit 11 around the optical axis x can be fixed.

Further, the lower surface of the protrusion end portion 28 of the shutter unit 11 abuts against the deep wall surface of the engagement recess portion 29. The lower surface of the end portion of the mechanism portion 24 opposite to the protrusion end portion 28 abuts against the upper surface of a mount boss portion 30 of the rear lens barrel 8. Two resilient members 12 is sandwiched between a first press portion 31 shown by one-dot chain line disposed on the upper portion of the protrusion end portion 28 and a first press contact portion 33 on the lower surface of the front lens barrel 7 and between a second press portion 32 opposite to the portion abutting against the mount boss portion 30 and a second press contact portion 34 on the lower surface of the front lens barrel 7, respectively. In a state that the front lens barrel 7 and the rear lens barrel 8 are integrally fixed, the front lens barrel 7 does not directly come into contact with the shutter unit 11 to exert a force in the optical-axis x direction but presses the shutter unit 11 against the engagement recess portion 29 and the mount boss portion 30 of the rear lens barrel 8 via two resilient members 12.

That is to say, if the resilient members 12 are not present, the shutter unit 11 has a play in a gap formed between the front lens barrel 7 and the rear lens barrel 8 and is movable in the optical-axis x direction. However, since the resilient members 12 are sandwiched in a compressed state, the shutter unit 11 is pressed against the rear lens barrel 8 due to a restoring force and fixed so as not to rattle between the front lens barrel 7 and the rear lens barrel 8.

Thus, a thickness "t" of a portion of the shutter 11 in a gap "g" between the lower surface of the front lens barrel 7 and the mount boss portion 30 of the rear lens barrel 8 is smaller than the gap "g". The thickness of the resilient members 12 is larger than a difference between the gap "g" and the thickness "t".

In the lens unit 6 having the above construction, the dimension of the shutter unit 11 does not affect positioning of the lens groups 9, 10, 13, 14, 15 and the imaging device 17. Thus, the lens unit 6 can image the light entering from the object on the imaging surface of the imaging device 17 with a high degree of accuracy. On the other hand, as the dimensional accuracy of the shutter unit 11 is not required, the shutter unit 11 can be fabricated inexpensively.

Further, the shutter unit 11 is sandwiched between the front lens barrel 7 and the rear lens barrel 8 via the resilient members 12. Therefore, it is not necessary to provide any elements for fixation such as screw holes outside the drive mechanism of movable vanes looking from the optical-axis x direction, which does not cause the projected area to be enlarged. Thus, the lens unit 6 has also small projected area in the optical-axis x direction, contributing to making the digital camera 1 slim.

As the shutter unit 11 is inserted in the gap between the front lens barrel 7 and the rear lens barrel 8 when integrally fixing the front lens barrel 7 and the rear lens barrel 8, the lens unit 6 has a small man-hour of assembly and can be fabricated inexpensively.

In the present embodiment, as the rear lens barrel 8 supports the shutter unit in the optical-axis x direction at two positions of the engagement recess portion 29 and the mount boss portion 30, two resilient members 12 are disposed on the press portions 31, 32 which are positioned at the opposite side in the optical-axis x direction with respect to the engagement recess portion 29 and the mount boss portion 30. However, the position where the resilient members 12 are positioned and the position where the rear lens barrel 8 abuts against the shutter unit 11 are not necessarily aligned with each other in the optical-axis x direction. For example, if the shutter unit 11 is arranged to abut against the rear lens barrel 8 at more than 3 points, only one resilient member 12 disposed in the vicinity of the center portion of the shutter unit 11 allows the shutter unit 11 to be pressed against the rear lens barrel 8 without rattling.

Figure 5:
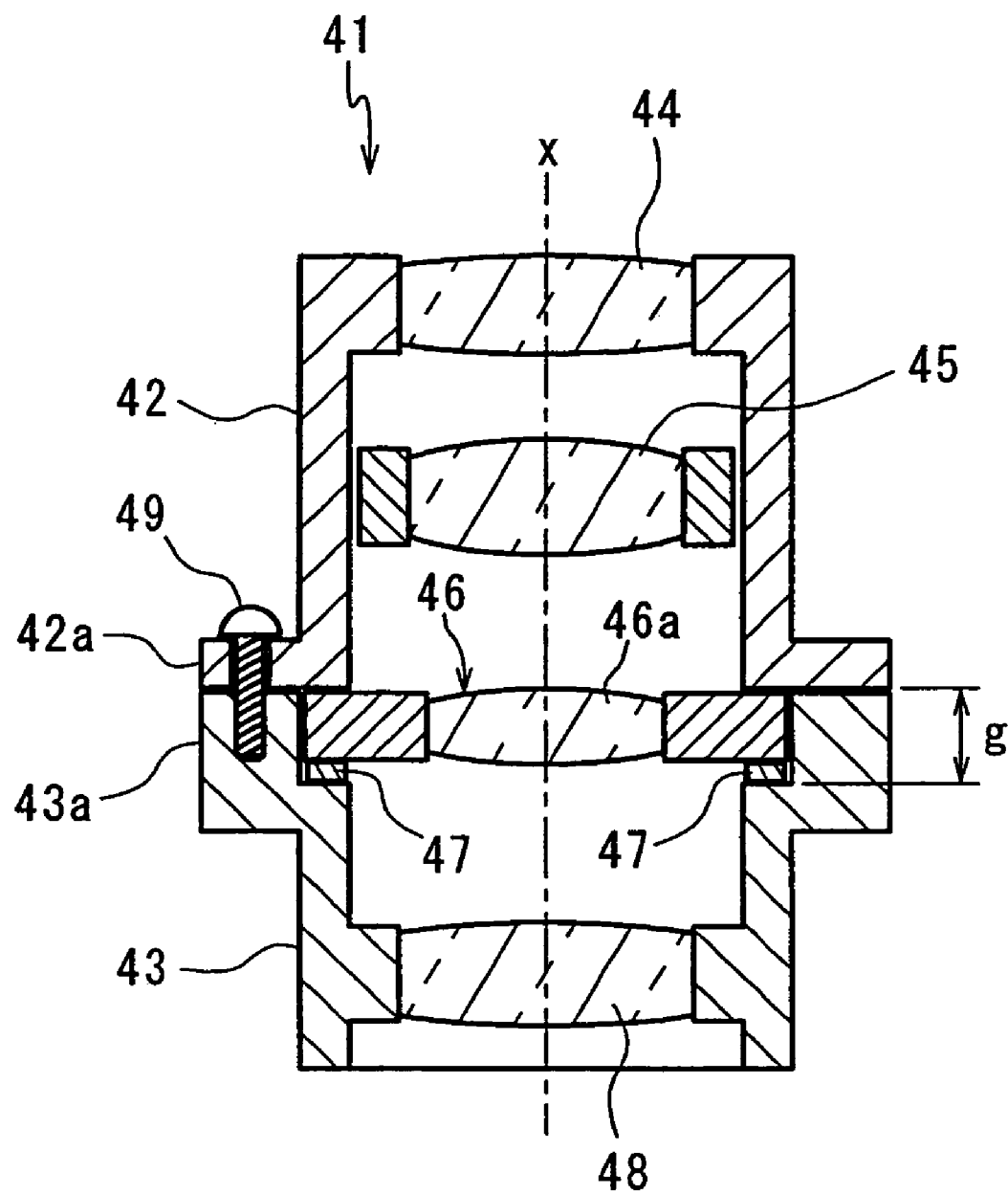
FIG. 5 is a schematic sectional view of a lens unit of a second embodiment of the present invention.
Figure 6:
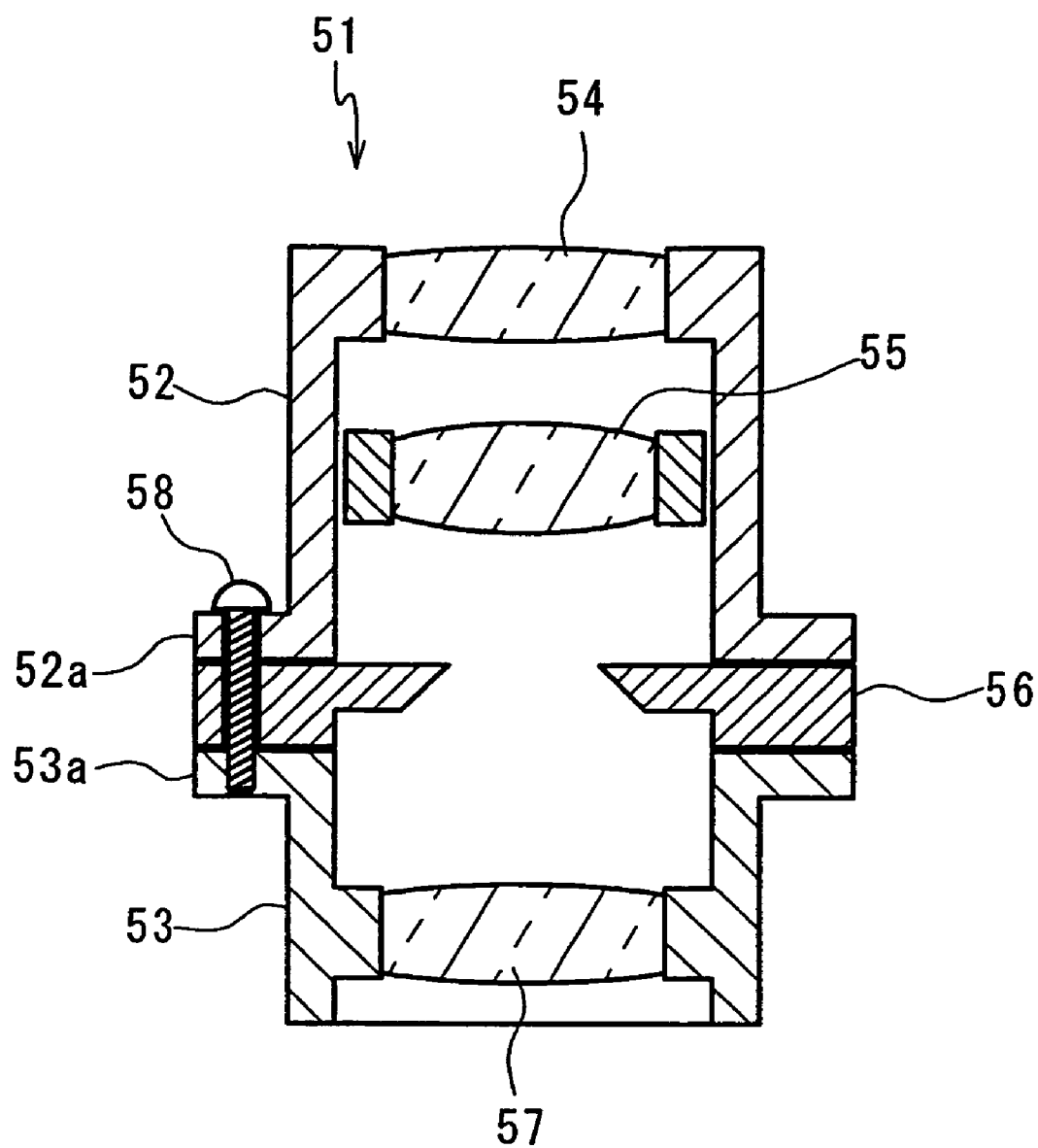
FIG. 6 is a schematic sectional view of a conventional lens unit.
Figure 7:
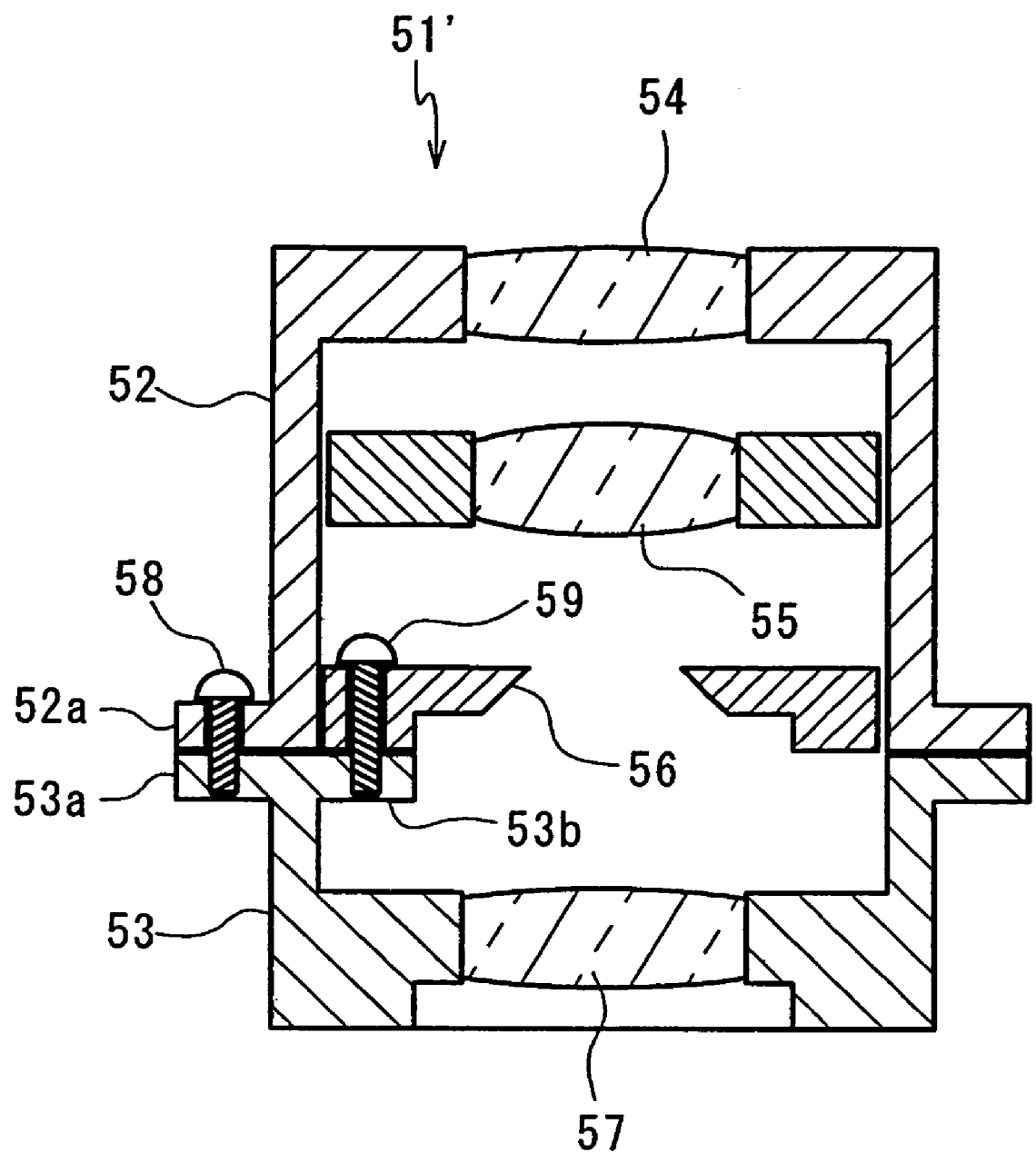
FIG. 7 is a schematic sectional view of a conventional lens unit different from that of FIG. 6.

FIG. 5 schematically shows a lens unit 41 of a second embodiment of the present invention. The lens unit 41 has an object side, i.e. upper side in the figure and an imaging surface side, i.e. lower side in the figure. The lens unit 41 comprises a front lens barrel 42 and a rear lens barrel 43. A first lens 44 is fixed on the end portion of the object side of the front lens barrel 42. A second lens (zoom lens) 45 movable in the optical-axis x direction is disposed in the front lens barrel 42. In a gap "g" defined between the front lens barrel 42 and the rear lens barrel 43, an anti-shake unit (inter-barrel member) 46 and a resilient member 47 are interposed. A third lens 48 is fixed on the imaging surface side of the rear lens barrel 43. The front lens barrel 42 and the rear lens barrel 43 have a flange portion 42a and a flange portion 43a fixed with each other by means of screws 49. In this state, the resilient member 47 is compressed in the optical-axis x direction so that the anti-shake unit 46 can be pressed against the rear lens barrel 42.

The anti-shake unit 46 is arranged to drive a movable lens 46a perpendicular to the optical axis x to stabilize image.

In the present embodiment, the accuracy of the positioning of the ariti-shake unit 46 in the optical-axis x direction is ensured by the abutment of the anti-shake unit 46 against the front lens barrel 42 while the positioning in the direction perpendicular to the optical axis x has low requirement to the dimensional accuracy because a feed back control can be conducted. Thus, the lens unit 41 has a high imaging accuracy and can be fabricated inexpensively in spite of small size.

Although the present invention has been fully described by way of the examples with reference to the accompanying drawing, it is to be noted that various changes and modifications will be apparent to those skilled in the art. Therefore, unless such changes and modifications otherwise depart from the spirit and scope of the present invention, they should be construed as being included therein.

What is claimed is:

1. A method for fabricating a lens unit, comprising steps of:
   disposing an inter-barrel member in a gap defined between a front lens barrel on a subject side in an optical-axis direction and a rear lens barrel on an imaging surface side in the optical-axis direction;
   bringing the inter-barrel member into close contact with one of the front lens barrel and the rear lens barrel in the optical-axis direction;
   inserting a resilient member into a space in the optical-axis direction between the inter-barrel member and the other of the front lens barrel and the rear lens barrel; and
   fixing the front lens barrel and the rear lens barrel integrally fixed with each other to prevent all movement between the front lens barrel and the rear lens barrel, and to compress the resilient member in the optical-axis direction.

2. A lens unit, comprising:
   a front lens barrel;
   a rear lens barrel, the rear lens barrel and the front lens barrel fixedly contacting each other in the optical-axis direction and forming a gap therebetween in an optical-axis direction, wherein all movement between the front lens barrel and the rear lens barrel is prevented;
   an inter-barrel member disposed in the gap, the inter-barrel member coming into close contact with one of the front lens barrel and the rear lens barrel in the optical-axis direction; and
   a resilient member inserted in a compressed state into a space in the optical-axis direction between the inter-barrel member and the other of the front lens barrel and the rear lens barrel.

3. The lens unit as in claim 2, wherein the inter-barrel member is a shutter unit.

4. The lens unit as in claim 2, wherein the inter-barrel member is a unit for driving an optical member to stabilize image.

5. The lens unit as in claim 2, wherein at least any one of the rear lens barrel and the front lens barrel has a zoom lens movable in the optical-axis direction.

6. The lens unit as in claim 2, wherein the front lens barrel has an optical member for bending the optical axis by substantially 90 degree.

7. An imaging apparatus, comprising a lens unit and an imaging device for converting an image formed by the lens unit, the lens unit comprising:
- a front lens barrel;
- a rear lens barrel, the rear lens barrel and the front lens barrel fixedly contacting each other in the optical-axis direction, and forming a gap therebetween in an optical-axis direction;
- an inter-barrel member disposed in the gap, the inter-barrel member coming into close contact with one of the front lens barrel and the rear lens barrel in the optical-axis direction;
- a resilient member inserted in a compressed state into a space in the optical-axis direction between the inter-barrel member and the other of the front lens barrel and the rear lens barrel; and
- a fixing member configured to integrally fix the front lens barrel with the rear lens barrel to prevent all movement between the front lens barrel and the rear lens barrel.

8. The lens unit as in claim 7, wherein the inter-barrel member is a shutter unit.

9. The lens unit as in claim 7, wherein the inter-barrel member is a unit for driving an optical member to stabilize image.

10. The lens unit as in claim 7, wherein at least any one of the rear lens barrel and the front lens barrel has a zoom lens movable in the optical-axis direction.

11. The lens unit as in claim 7, wherein the front lens barrel has an optical member for bending the optical axis by substantially 90 degree.

* * * * *